(12) United States Patent
Giovannini et al.

(10) Patent No.: US 11,097,300 B2
(45) Date of Patent: Aug. 24, 2021

(54) APPARATUS AND METHOD FOR CLEANING AND RECOVERING PAINT IN PAINTING PLANTS

(71) Applicant: CEFLA SOCIETA' COOPERATIVA, Imola (IT)

(72) Inventors: Cristian Giovannini, Imola (IT); Cristian Pungetti, Ozzano dell'Emilia (IT); Luigi Franzoni, Imola (IT)

(73) Assignee: CEFLA SOCIETA' COOPERATIVA

( * ) Notice: Subject to any disclaimer, the term of this patent is extended or adjusted under 35 U.S.C. 154(b) by 0 days.

(21) Appl. No.: 16/505,013

(22) Filed: Jul. 8, 2019

(65) Prior Publication Data

US 2020/0009592 A1 Jan. 9, 2020

(30) Foreign Application Priority Data

Jul. 9, 2018 (IT) .......................... 102018000007024

(51) Int. Cl.
| | |
|---|---|
| *B05B 14/20* | (2018.01) |
| *B65G 45/22* | (2006.01) |
| *B65G 45/24* | (2006.01) |
| *B65G 45/12* | (2006.01) |

(52) U.S. Cl.
CPC .............. *B05B 14/20* (2018.02); *B65G 45/22* (2013.01); *B65G 45/24* (2013.01); *B65G 45/12* (2013.01)

(58) Field of Classification Search
CPC ......... B05B 14/20; B05B 15/50; B65G 45/22; B65G 45/24; B65G 45/12; B65G 45/26
See application file for complete search history.

(56) References Cited

FOREIGN PATENT DOCUMENTS

| EP | 1059249 A1 | 12/2000 | |
|---|---|---|---|
| EP | 1136391 A2 | 9/2001 | |
| EP | 1362809 A1 | 11/2003 | |
| EP | 1964795 A1 | 9/2008 | |
| EP | 2537595 A1 | 12/2012 | |
| EP | 1964794 B1 | 11/2016 | |
| EP | 3165480 A1 * | 5/2017 | ............ B05B 14/20 |

(Continued)

*Primary Examiner* — Natasha N Campbell
(74) *Attorney, Agent, or Firm* — Laubscher & Laubscher, P.C.

(57) ABSTRACT

A paint recovery and cleaning trolley is provided for an apparatus for applying paint provided with a belt for conveying pieces to be painted.
The conveyor belt has an upper outward section and a lower return section. The trolley includes a paint recovery subunit and a cleaning subunit. Each subunit includes a reverse roller in contact with the lower return section of the conveyor belt, a doctor blade tangentially placed with respect to the reverse roller for all its length, and a doctor blade scraping the lower return section of the conveyor belt. In each subunit the respective reverse roller, doctor blades and return section of the conveyor belt form a closed chamber having the shape of a triangular prism, of which the components represent the rectangular faces and that contains a solvent which drips from the triangular faces into a respective collecting hopper. Three positions of the trolley are provided including two inserted positions in which the trolley is totally inserted under the conveyor belt and may be inactive or in operation and a lateral extracted position in which the trolley is totally extracted from the apparatus for applying paint.

7 Claims, 4 Drawing Sheets

(56) References Cited

FOREIGN PATENT DOCUMENTS

| | | |
|---|---|---|
| EP | 3335799 A1 | 6/2018 |
| IT | 102016000094514 | 9/2016 |
| WO | 2017090797 A1 | 6/2017 |

* cited by examiner

APPARATUS AND METHOD FOR CLEANING AND RECOVERING PAINT IN PAINTING PLANTS

This application claims priority of IT102018000007024 filed Jul. 9, 2019. The entire content of this application is incorporated herein by reference.

The present invention relates to the technical field of the apparatuses for painting pieces made of sundry materials (wood, glass, fibrocement, etc.). In particular, the invention relates to an extractable trolley for the cleaning of the conveying system of the pieces and for recovering paint.

Apparatuses provided with a cleaning trolley, with different possibilities of lateral and frontal access, are known in the art. Generally, frontal access trolleys require a production stop in order to access said trolleys.

EP1964794B1 of the same applicant describes a cleaning system of the belt conveying said pieces.

Patent application IT102016000094514, in the name of the same applicant, describes a system wherein the function of paint recovery and cleaning are independent so as to provide a plurality of independent recovery units, so that the cleaning of a cleaning or recovery unit can be performed without production stop. Said system is preferably laterally extracted.

Nonetheless, practice showed the limits of the known art, in particular the encumbrance of the second solution, and the imperfect efficiency of paint recovery for the first solution.

Aim of the present invention is providing an improved paint recovery and cleaning trolley, having the smallest encumbrance possible and the best efficiency of paint recovery and cleaning operation.

This object is achieved by an apparatus and a method having the features of the independent claims. Advantageous embodiments and refinements are specified in claims dependent thereon.

The paint recovery and cleaning system according to the present invention includes just one paint recovery and cleaning trolley, wherein the functions of paint recovery and cleaning of the conveying belt are integrated, providing a cleaning system provided with the best efficacy, and a minimal encumbrance.

The paint recovery and cleaning system according to the present invention provides the presence, in just one trolley, of a subunit for paint recovery, and of a subunit for the fine cleaning of the conveying belt. Said subunits are very similar, providing the cooperation of a reverse roller removing paint from the return section of the conveying belt, a doctor blade removing the solvent from the conveying belt, solvent that is supplied by a nozzle, a doctor blade tangentially adhering to said roller for its whole length. Said four components (reverse roller, drying doctor blade, adhering doctor blade and return section of the conveying belt) form a chamber having the shape of a triangular prism, whose rectangular faces, made of said reverse roller, doctor blades and belt generate a continuous closed surface, while the two opposed triangular bases are open. Said configuration, which is open at the two opposed end in form of triangular bases placed on the sides of the apparatus for applying paint, allows a limited aeration that reduces the evaporation of the solvent.

It is worthwhile mentioning that said trolley can occupy different positions with respect to the apparatus for applying paint:

Operative position, wherein said trolley is totally inserted under said conveying belt, and the paint recovery subunit and cleaning subunits are lifted so that they are in contact with the lower return section of said conveying belt;

Inactive inserted position, wherein said trolley is totally inserted under said conveying belt, but the paint recovery subunit and cleaning subunit are lowered so that they are not in contact with the lower return section of said conveying belt;

Lateral extracted position, wherein said trolley is totally extracted from the apparatus for applying paint.

It is worthwhile mentioning that the space under the conveying belt is very limited, and the construction of the trolley according to the present invention was optimized in order to make every single paint recovery and cleaning trolley as compact as possible. In one configuration, the trolley is provided in two specimens, so that one trolley placed in the working position in contact with the conveying belt can be used, while a second trolley is maintained in a resting position, not in contact with the conveying belt. This solution has the advantage to allow the maintenance of one of said two trolleys while the other is used for paint recovery and cleaning, without the need to stop the paint applying apparatus. Nonetheless, it is worthwhile specifying that the apparatus can perfectly work even if it is provided with just one paint recovery and cleaning trolley.

The method according to the present invention includes the following steps:

Inserting a paint recovery and cleaning trolley laterally with respect to the advancing direction of the pieces to be painted;

Bringing the respective roller and doctor blade of said trolley into contact with the conveying belt to be cleaned;

Using the paint recovery and cleaning trolley for the desired time;

Interrupting the contact between roller and doctor blade with the conveying belt;

Laterally extracting the paint recovery and cleaning trolley;

all the mentioned operations can be performed while the paint applying apparatus is painting.

A first advantage of the present invention is the possibility of preventing the production stop connected with the cleaning and maintenance of paint recovery and cleaning trolleys. This is particularly advantageous in complex production lines comprising a plurality of apparatuses placed in series, wherein the stop of a single apparatus involves the stopping of all the apparatuses belonging to the production line.

A second advantage is providing a modular solution to the problem, providing at least two paint recovery and cleaning units, one of which is working while the other can be extracted for maintenance, even when the paint applying apparatus is working. Alternatively, the trolley which underwent maintenance, already available in an inactive inserted position, is ready to be used for a fast colour change with recovery of the paint of a different colour, without the need to clean the trolley used up to that moment.

In a solution, the paint applying apparatus is provided with three trolleys, two of which are inserted in the paint applying apparatus, while the third can undergo maintenance in a cleaning station remote from the paint applying apparatus.

A third advantage is that the complete extraction of the cleaning trolley from the apparatus is eased in order to move it to a cleaning station remote from the paint applying apparatus, thanks to the fact that the trolley is provided with a ground support and a guide system for the lateral sliding of the trolley.

Further advantages and properties of the present invention are disclosed in the following description, in which exemplary embodiments of the present invention are explained in detail based on the drawings:

Figure 1:
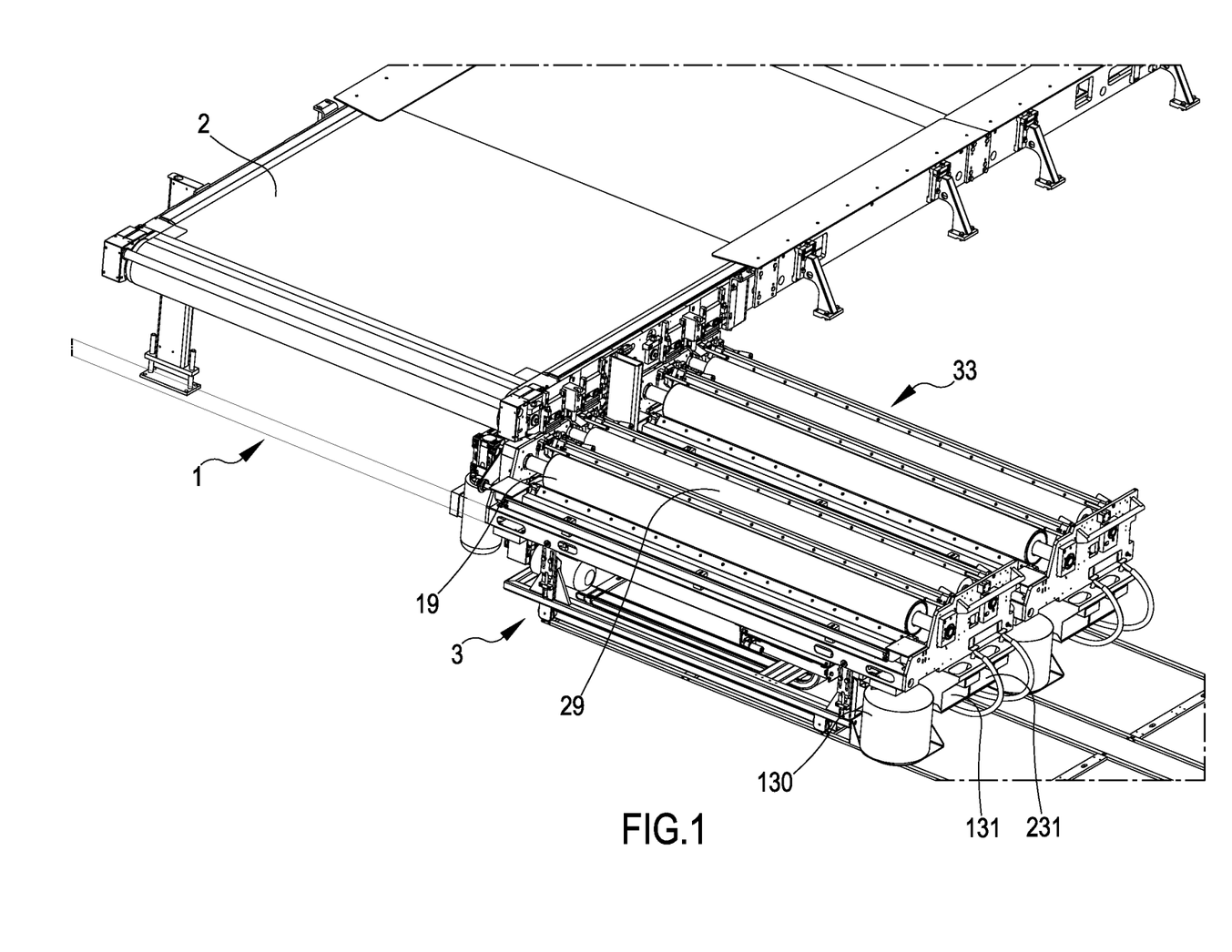
FIG. 1 Axonometric view of an apparatus for applying paint with two paint recovery and cleaning trolleys in the extracted position.

FIG. 1 shows an embodiment, wherein an apparatus 1 for applying paint, including a conveying belt 2 of the (not shown) pieces to be painted, is provided with two paint recovery and cleaning trolleys 3, 33 according to the present invention. In FIG. 1 said trolleys 3, 33 are shown in the lateral extracted position, while in order to carry out the paint recovery and cleaning they must be shifted under the conveying belt 2, up to their complete alignment with the conveying belt itself.

Figure 2:
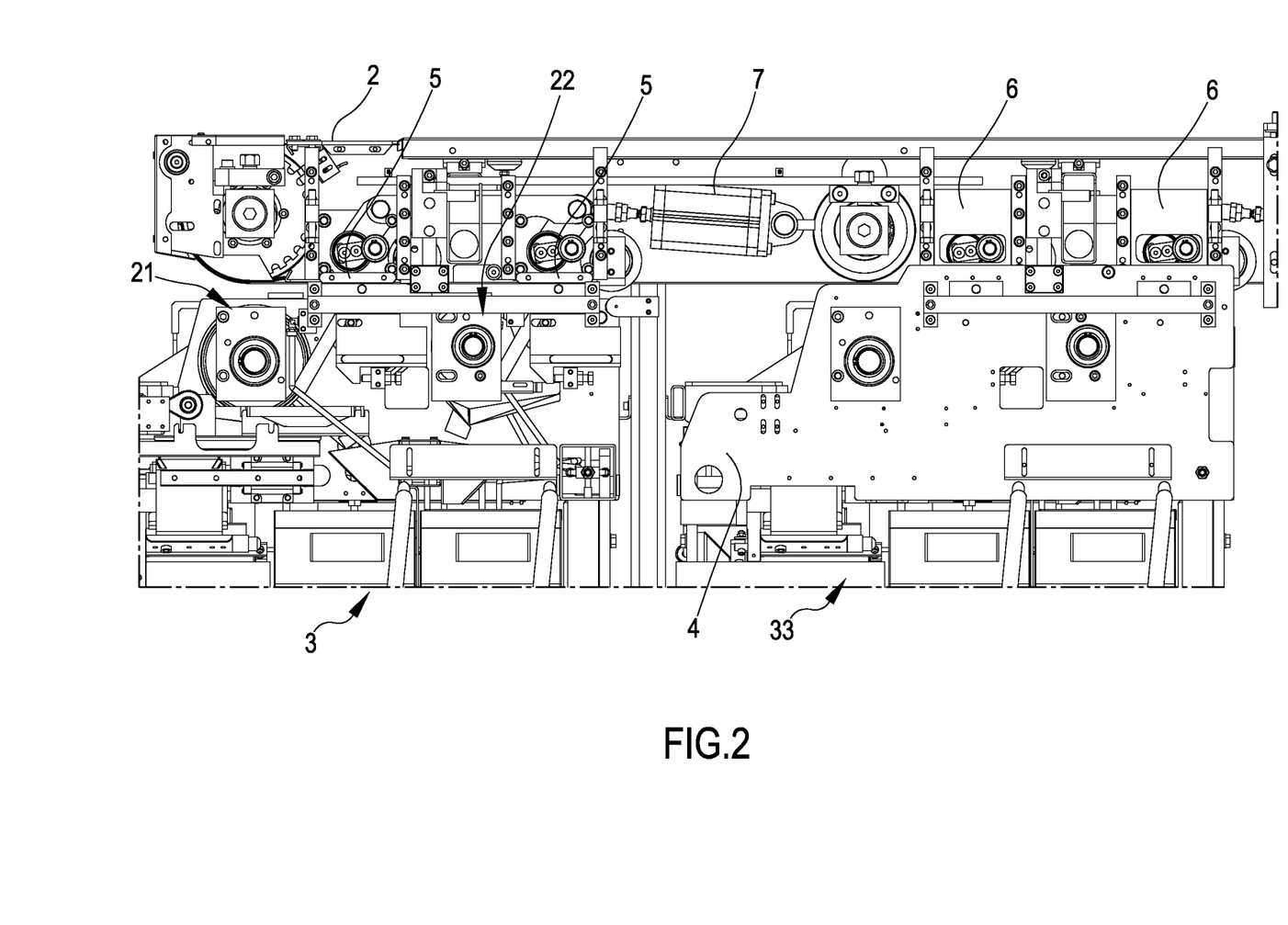
FIG. 2 Lateral view of said two paint recovery and cleaning trolleys, both in line with the conveying belt.
Figure 3:
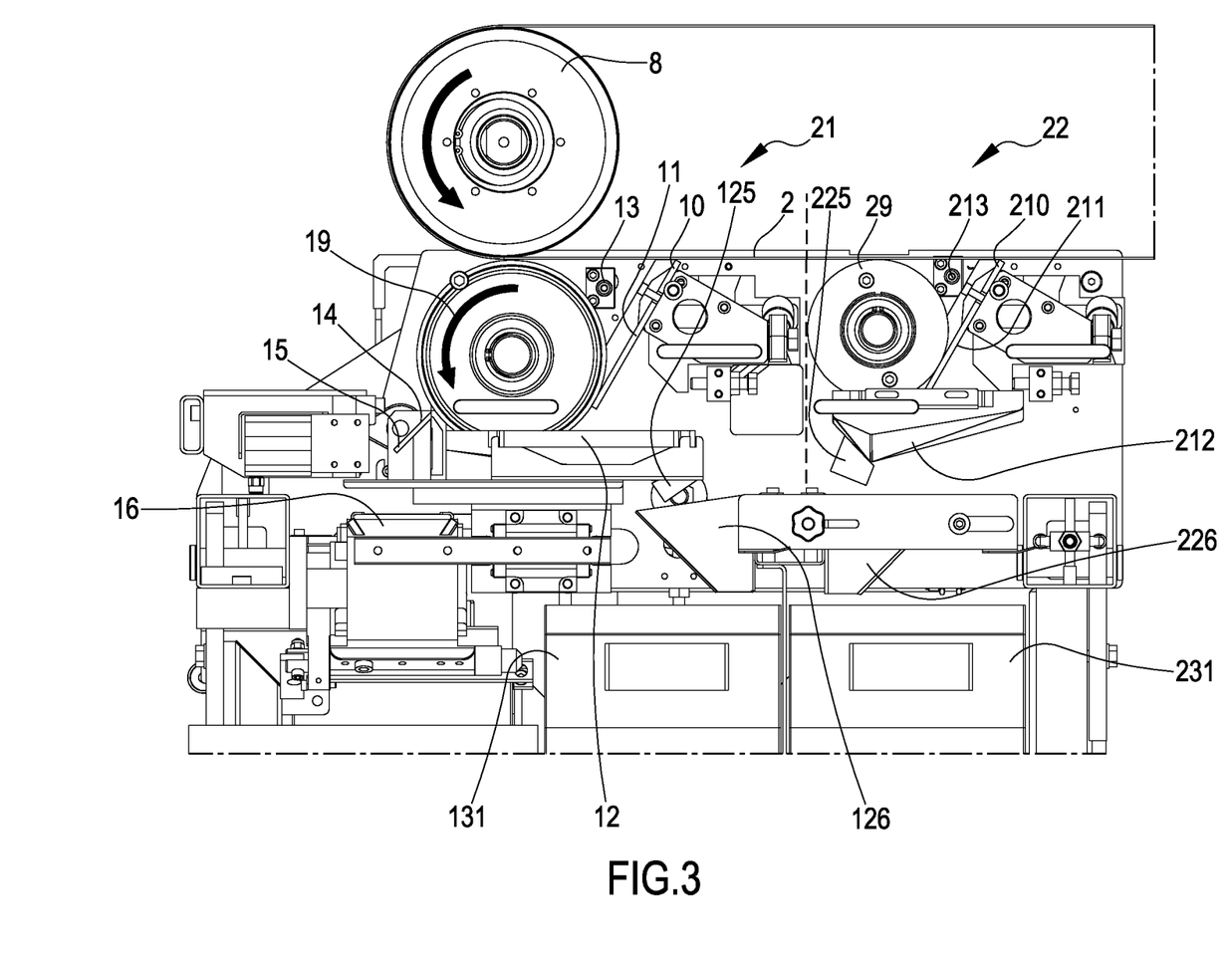
FIG. 3 Lateral view of a detail of the rollers and doctor blades for paint recovery and cleaning.

The conveying belt 2 of the pieces to be painted is typically a closed belt, which is moved by two rollers, one of which is motorized (not shown) and an idle roller 8 (visible in FIGS. 2 and 3). Said solution is well known in the art, and provides an upper outward section of the belt, on which the pieces to be painted lie, and a lower return section (visible in FIGS. 2 and 3).

While in use, on the pieces to be painted a paint is applied, which falls undesirably on the conveying belt 2, too, which therefore must be cleaned in order not to soil the following pieces to be painted. As a consequence, the return lower section of the belt is cleaned using the paint recovery and cleaning trolleys according to the present invention.

FIG. 2 shows in a lateral view said two paint recovery and cleaning trolleys 3, 33 in the inserted, but not lifted, position under the conveying belt 2. It is worthwhile specifying that, in order to perform paint recovery and cleaning, each trolley 3, 33 must first be inserted completely under said conveying belt 2, and second lifted so that rollers and doctor blades come into direct contact with the conveying belt 2 to be cleaned. The position of the trolleys 3, 33 shown in FIG. 2 can be defined inserted inactive position.

Although the two trolleys 3, 33 are actually equal, they are shown in a different way in FIG. 2: the first trolley 3 is shown without its lateral side 4, which is visible for the second trolley 33. To said side 4 a tongue 5 is fastened, which coupling with a plate 6 allows the lifting, through a pneumatic cylinder 7, of the single trolley 3, 33 in its operative position, wherein the trolley is in contact with the conveying belt 2. Each trolley 3, 33 is provided with its own independent lifting system (the cylinder of the second trolley 33 is not visible in the Figure). The lifting systems 7 may be integral with the frame of the conveying system, because in this way, when in operative position, the system is overall more rigid, and the relative position of the trolley with respect to the conveying belt is more reliable and constant over time.

In order to reduce the encumbrance, the pneumatic cylinder 7 and all the lifting mechanism are placed between the outward section and the lower return section of the conveying belt 2.

When a paint recovery and cleaning trolley 3, 33 is in the extracted position shown in FIG. 1, all the (electric, pneumatic) supplies are connected. Nonetheless, in this position the cleaning of the trolley can be performed without the need to disconnect said supplies, which allows to perform a faster maintenance and cleaning of the trolley. When trolleys are connected to the painting apparatus, the possibility of moving the rollers of the trolley and the circulation of solvent can be exploited. When connected to, and supplied by, the painting apparatus 1, the trolley can perform all operation. Nonetheless, disconnecting the supplies and completely removing the trolley 3, 33 is possible, in order to bring it to a cleaning and maintenance station remote from the paint applying apparatus 1. This to allow the use of further tools, like e.g. a pressure washer, for a deeper cleaning of trolleys 3, 33.

FIG. 3 shows a detail of paint recovery and cleaning trolleys 3, 33 in their working position, i.e. inserted and lifted, wherein the rollers and the doctor blades are in contact with the lower return section of the belt 2 conveying the pieces to be painted. It is worthwhile specifying that trolleys 3, 33 are equal, work in the same way, and are interchangeable.

Moreover, it is worthwhile specifying that each trolley 3, 33 comprises two subunits 21, 22: the first subunit 21 recovers paint, while the second subunit 22 cleans the conveying belt 2. The vertical dotted line allows to better distinguish the paint recovery subunit 21 from the cleaning subunit 22. The said two subunits 21, 22 have the same components, which for the first subunit 21 are preceded by numeral 1, while for the subunit 22 are preceded by numeral 2. In the cleaning subunit 22 the components doctor blade 14, plate 15, belt 16 are missing, in that they are characteristic of paint recovery and channelling, as the paint is recovered by the subunit 21 only.

In a first step in the subunit 21 paint is recovered, through a reverse roller 19, a doctor blade 10, a doctor blade 11, a nozzle 13 and a hopper 12. Said doctor blade 11 is tangential with respect to said reverse roller 19, said doctor blade 10 is oblique with respect to the return section of the conveying belt 2; said doctor blades 10 and 11 lay on a same plane, which is one of the rectangular sides of the prismatic chamber containing solvent. In particular, the Figure shows an idle roller 8, which is part of the moving system of the conveying belt 2. Said reverse roller 19 is motorized with a rotation such that, in the contact point between said roller and conveying belt, the reverse roller 19 is provided with a tangential motion opposed to the advancing of the belt 2. In this way, the said roller 19 can remove said paint from the belt 2. For both rollers, a black arrow shows their direction of rotation. In contact with said motorized reverse roller 19 there is provided the doctor blade 11, tangentially adhering to said reverse roller 19 for all its length. In contact with the conveying belt 2 there is provided the doctor blade 10 that dries the conveying belt 2 after paint recovery. At least a nozzle 13 supplies a solvent compatible with the paint in use.

Said doctor blade 10, reverse roller 19, doctor blade 11 and conveying belt 2 form a closed chamber for all the length of the roller 19 and belt 2. Said closed chamber contains the solvent provided by the nozzle 13, which accumulates in the contact zone between said reverse roller 19 and doctor blade 11, wetting the surface of the roller 19, which in its turn wets the belt 2 with the solvent. This facilitates the removal of paint, occurring through the doctor blade 10. The solvent accumulated in the contact zone between the reverse roller 19 and the doctor blade 11 drains from the triangular lateral apertures of the chamber, so as to generate a continuous renewal of solvent, which gathers in a solvent recovery hopper 12. From said hopper 12, through gravity, the solvent overflown from the closed chamber through a collector 125 and a following funnel 126 is collected in a reservoir 131 for solvent recovery.

The solvent collected in said reservoir 131 can be reintroduced in the closed chamber formed by the components reverse roller 19, doctor blade 10, doctor blade 11, belt 2 thanks to the action of a (not shown) circuit pump, again through the nozzle 13.

The paint accumulated on the conveying belt 2, when comes into contact with reverse roller 19, is mechanically removed accumulating on the roller 19 itself, from which it is removed by a doctor blade 14, which is secant to the roller 19, to convey it on a plate 15 which makes it fall on a belt 16. Said belt 16 is a motorized belt conveying said paint towards another doctor blade 17 (shown in FIG. 4), which makes it fall into a paint collecting reservoir 130.

The components of said paint recovery subunit 21 are substantially duplicated in the cleaning subunit 22 in the trolley 3 or 33, with a further reverse roller 29, a doctor blade 210, a doctor blade 211, a hopper 212, a nozzle 213, which work exactly in the same way already described above. The cleaning subunit 22 allows a fine cleaning of the conveying belt 2. From the hopper 212 for cleaning solvent collection, the cleaning solvent through a collector 225 is collected by a funnel 226 to be collected in a solvent recovery reservoir 231. In this second cleaning subunit 22, including the components reverse roller 29, doctor blade 210, doctor blade 211, doctor blade 212, nozzle 213, collector 225, funnel 226, solvent recovery collector 231, a solvent different from that used in the paint recovery subunit 21 can be used. Said paint recovery subunit 21 includes the components reverse roller 19, doctor blade 10, doctor blade 11, hopper 12, nozzle 13, collector 125, funnel 126, solvent recovery reservoir 131. This is possible because the solvent is then channelled to a solvent reservoir 231 different from said solvent reservoir 131. This separation of path and reservoirs has the advantage of not polluting the paint recovered with this, possibly different, second solvent.

Figure 4:
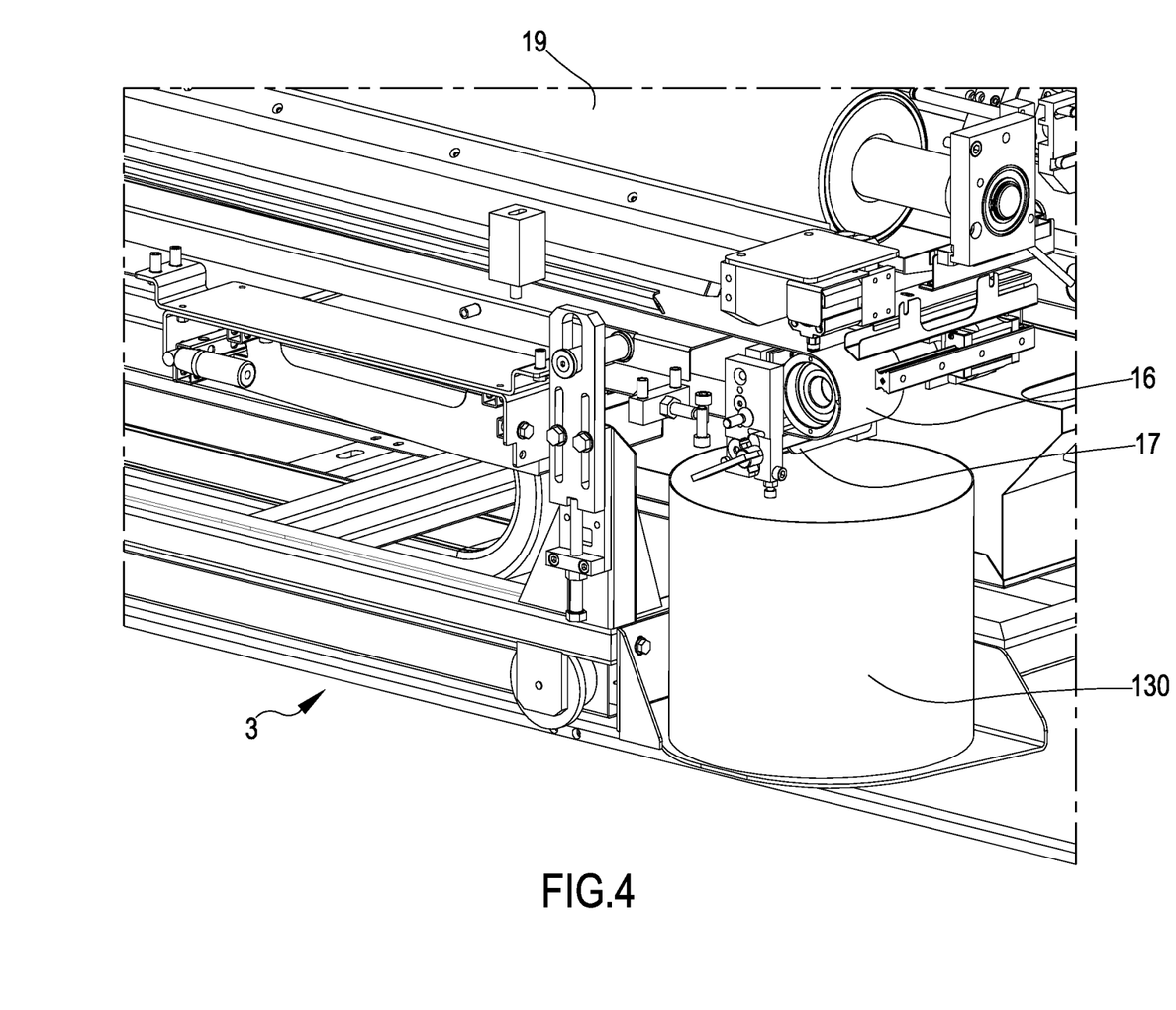
FIG. 4 Axonometric view of a paint recovery and cleaning trolley, in the area of channelling and collection of the recovered paint.

FIG. 4 shows the conveying belt 16 conveying the recovered paint, which falls from plate 15. The doctor blade 17 transfers the paint recovered from belt 16 to a container 130 for paint recovery through a mechanical action of scraping and subsequent fall into the paint recovery reservoir 130.

In a cheap version of the paint applying apparatus, just one paint recovery and cleaning trolley 3 can be used, working in the above-described way.

In an embodiment, there are provided two paint recovery and cleaning trolleys 3 and 33, with alternate working: when the first trolley 3 is in the operative inserted and lifted position, the second trolley 33 can be in the inactive inserted position, or can be absent in that it is in a cleaning station remote from the paint applying apparatus. Alternatively, the same apparatus 1, which provides the presence of two paint recovery and cleaning trolley 3, 33 is bought by a customer provided with just one trolley 3, and the space normally occupied by the trolley 33 is empty.

Alternatively, the customer can use the two paint recovery and cleaning trolley 3 and 33 at the same time, for an even deeper paint recovery and cleaning.

Further alternatively, the final customer buys the apparatus for applying paint provided with three paint recovery and cleaning trolleys 3, 33, so that the space available for said trolleys is always occupied by two trolleys, while the third paint recovery and cleaning trolley is an a cleaning station remote from the paint applying apparatus.

The invention claimed is:

1. A paint recovery and cleaning trolley for an apparatus for applying paint provided with a conveyor belt for conveying pieces to be painted, the conveyor belt having an upper outward section and a lower return section, the trolley including:
   a paint recovery subunit, in its turn including:
      a reverse roller in contact with the lower return section of said conveyor belt, which in use recovers paint from the conveyor belt,
      a doctor blade tangentially placed with respect to said reverse roller for all its length, to allow the accumulation of a solvent and wetting said reverse roller;
      a doctor blade scraping the reverse roller so recovering paint;
      a doctor blade scraping the lower return section of said conveyor belt,
      at least one nozzle for supplying a solvent compatible with the paint in use,
      a collecting hopper collecting said solvent, placed under said reverse roller,
      a paint collecting reservoir,
   a cleaning subunit, in its turn including:
      a reverse roller in contact with the lower return section of the conveyor belt, which in use recovers paint from the conveyor belt,
      a doctor blade tangentially placed with respect to said reverse roller of the cleaning subunit for all its length to allow the accumulation of a solvent and wetting said reverse roller,
      a doctor blade scraping the lower return section of said conveyor belt,
      at least a nozzle for supplying a solvent,
      a collecting hopper collecting said solvent, placed under said reverse roller of the cleaning subunit,
      a solvent collecting reservoir,
   wherein in each subunit the respective components reverse roller, doctor blades and return section of the conveyor belt form a closed chamber having the shape of a triangular prism, of which said components represent the rectangular faces, said chamber containing said solvent, which drips from the triangular faces of said chamber into the respective collecting hopper;
   wherein there are provided three positions of the trolley with respect to the apparatus for applying paint, said three positions including
      an operative position, in which said trolley is totally inserted under said conveyor belt, and the paint recovery subunit and the cleaning subunit are lifted so that they are in contact with the lower return section of said conveyor belt;
      an inactive inserted position, in which said trolley is totally inserted under said conveyor belt, but the paint recovery subunit and cleaning subunit are lowered so that they are not in contact with the lower return section of said conveyor belt;
      a lateral extracted position, in which said trolley is totally extracted from the apparatus for applying paint.

2. The paint recovery and cleaning trolley for an apparatus for applying paint according to claim 1, wherein said paint recovery and cleaning trolley is extracted from the apparatus for applying paint in a direction that is perpendicular with respect to an advancing direction of the conveyor belt of the pieces to be painted.

3. The paint recovery and cleaning trolley for an apparatus for applying paint according to claim 1, wherein in said paint recovery subunit the recovered paint, which is accumulated on said reverse roller is scraped by said doctor blade scraping said reverse roller to convey it on a plate which makes it fall on a motorized belt, which in turn makes it fall into a paint recovery reservoir, owing to the action of a further doctor blade scraping said motorized belt.

4. An apparatus for applying paint provided with at least two paint recovery and cleaning trolleys according to claim 1, to which apparatus said trolleys can be coupled with one in the operative position and one in the inactive inserted position or both in the operative position during working of the apparatus.

5. A paint recovery and cleaning trolley for an apparatus for applying paint provided with a conveyor belt for conveying pieces to be painted, the conveyor belt having an upper outward section and a lower return section, the trolley including:
 a paint recovery subunit, in its turn including:
  a reverse roller in contact with the lower return section of said conveyor belt, which in use recovers paint from the conveyor belt,
  a doctor blade tangentially placed with respect to said reverse roller for all its length, to allow the accumulation of a solvent and wetting said reverse roller;
  a doctor blade scraping the reverse roller so recovering paint;
  a doctor blade scraping the lower return section of said conveyor belt,
  at least one nozzle for supplying a solvent compatible with the paint in use,
  a collecting hopper collecting said solvent, placed under said reverse roller,
  a paint collecting reservoir,
 a cleaning subunit, in its turn including:
  a reverse roller in contact with the lower return section of the conveyor belt, which in use recovers paint from the conveyor belt,
  a doctor blade tangentially placed with respect to said reverse roller of the cleaning subunit for all its length to allow the accumulation of a solvent and wetting said reverse roller,
  a doctor blade scraping the lower return section of said conveyor belt,
  at least a nozzle for supplying a solvent,
  a collecting hopper collecting said solvent, placed under said reverse roller of the Cleaning subunit,
  a solvent collecting reservoir,
wherein in each subunit the respective components reverse roller, doctor blades and return section of the conveyor belt form a closed chamber having the shape of a triangular prism of which said components represent the rectangular faces, said chamber containing said solvent, which drips from the triangular faces of said chamber into the respective collecting hopper;
wherein there are provided three positions of the trolley with respect to the apparatus for applying paint, said three positions including
 an operative position, in which said trolley is totally inserted under said conveyor belt, and the paint recovery subunit and the cleaning subunit are lifted so that they are in contact with the lower return section of said conveyor belt;
 an inactive inserted position, in which said trolley is totally inserted under said conveyor belt, but the paint recovery subunit and cleaning subunit are lowered so that they are not in contact with the lower return section of said conveyor belt;
 a lateral extracted position, in which said trolley is totally extracted from the apparatus for applying paint;
wherein a shift from the operative position to the inactive inserted position is performed owing to at least one tongue provided in the sides of said trolley, which couple with a plate moved by a pneumatic cylinder of the apparatus for applying paint allows the lifting of said trolley, said pneumatic cylinder being integral with a frame of the apparatus for applying paint.

6. A paint recovery and cleaning trolley for an apparatus for applying paint provided with a conveyor belt for conveying pieces to be painted, said conveyor belt having an upper outward section and a lower return section, the trolley including:
 a paint recovery subunit, in its turn including:
  a reverse roller in contact with the lower return section of said conveyor belt, which in use recovers paint from the conveyor belt,
  a doctor blade tangentially placed with respect to said reverse roller for all its length, to allow the accumulation of a solvent and wetting said reverse roller;
  a doctor blade scraping the reverse roller so recovering paint;
  a doctor blade scraping the lower return section of said conveyor belt,
  at least one nozzle for supplying a solvent compatible with the paint in use,
  a collecting hopper collecting said solvent, placed under said reverse roller,
  a paint collecting reservoir,
 a cleaning subunit, in its turn including:
  a reverse roller in contact with the lower return section of the conveyor belt, which in use recovers paint from the conveyor belt,
  a doctor blade tangentially placed with respect to said reverse roller of the cleaning subunit for all its length to allow the accumulation of a solvent and wetting said reverse roller,
  a doctor blade scraping the lower return section of said conveyor belt,
  at least a nozzle for supplying a solvent,
  a collecting hopper collecting said solvent, placed under said reverse roller of the cleaning subunit,
  a solvent collecting reservoir,
 wherein in each subunit the respective components reverse roller, doctor blades and return section of the conveyor belt form a closed chamber having the shape of a triangular prism, of which said components represent the rectangular faces, said chamber containing said solvent, which drips from the triangular faces of said chamber into the respective collecting hopper
 wherein in said paint recovery subunit and in the cleaning subunit said solvent follows two distinct paths which are distinct up to their end, in that in the paint recovery subunit the solvent which accumulated on the reverse roller and collected in its respective hopper is channelled to a solvent recovery reservoir through a collector and a funnel, said solvent being recirculated from said solvent reservoir to its respective nozzle through a pump; while in the cleaning subunit the solvent which accumulated on the reverse roller and collected in its respective hopper is channelled to a solvent recovery reservoir through a collector and a funnel; said solvent being recirculated from said solvent reservoir to its respective nozzle through a pump.

7. The paint recovery and cleaning trolley for an apparatus for applying paint according to claim 6, wherein the solvent circulated in the paint recovery subunit is different from the solvent circulated in the cleaning subunit.

\* \* \* \* \*